Patented Nov. 14, 1950

2,529,671

UNITED STATES PATENT OFFICE 2,529,671

PURIFICATION OF THIONYL CHLORIDE

William E. Bissinger, Akron, Ohio, assignor to Pittsburgh Plate Glass Company, Allegheny County, Pa., a corporation of Pennsylvania No Drawing. Application August 4, 1948,
Serial No. 42,539

8 Claims. (Cl. 23—203)

This invention relates to the purification of thionyl chloride, $SOCl_2$, and more particularly to a process for removing sulfuryl chloride from thionyl chloride which is contaminated with this compound.

Thionyl chloride is a well-known material which in pure form is a water-white liquid having a specific gravity of 1.638, and a boiling point of 75.9° C. at 760 millimeters of mercury. Its utilization in commercial operations has been restricted somewhat because of the high cost of producing a relatively pure material which is low as to other chlorides which almost invariably are present as by-products of the main reaction by which the thionyl chloride is formed.

While certain methods for producing thionyl chloride yield a material which has a relatively low sulfuryl chloride content, none is known to yield an absolutely pure product. In U. S. Patent 2,431,823, granted to Alphonse Pechukas, December 2, 1947, there is disclosed a process by which thionyl chloride is prepared by reacting a sulfur chloride with sulfur dioxide and chloride at temperatures in excess of 100° C. While the thionyl chloride thus produced is relatively pure, nevertheless it contains a small amount of sulfuryl chloride which is considered undesirable for certain purposes. Thionyl chloride prepared by other processes also contains sulfuryl chloride in objectionable concentration which frequently is much higher than that produced by the above mentioned process.

Sulfuryl chloride is a colorless liquid which boils at 69° C. Since the boiling point of thionyl chloride is about 76° C., effective separation of the two chlorides by fractional distillation is impracticable in conventional distillation apparatus.

According to this invention it has been found that sulfuryl chloride may be largely removed from thionyl chloride by treatment of the thionyl chloride with a hydrocarbon or partially halogenated hydrocarbon which is capable of undergoing reaction with sulfuryl chloride. It has been found that such compounds preferentially react with sulfuryl chloride even when sulfuryl chloride is present in small amount, for example less than 5 percent by weight of thionyl chloride.

Thionyl chloride contaminated with sulfuryl chloride may be treated with a wide variety of hydrocarbons and partially halogenated hydrocarbons. These agents preferentially react with sulfuryl chloride but do not react excessively with thionyl chloride. Consequently the mixture thus produced comprises unreacted thionyl chloride and the product of reaction produced by the hydrocarbon or halogenated hydrocarbon. The nature of the reaction is such that the reaction products which are formed are high boiling and may easily be separated from the thionyl chloride by removing the lower boiling thionyl chloride preferably through simple distillation, leaving a residue which is readily removable from the reaction vessel.

It has been found that many hydrocarbons are suitable for this purification process. Of especial value are the predominantly aromatic hydrocarbons, that is those hydrocarbons having a greater number of carbon atoms in the ring structure than the number of carbon atoms in the substituent groups if any be present. Typical compounds are the mono- and polycyclic aromatic hydrocarbons and their partially halogenated derivatives such as the toluenes, xylenes, mesitylene, naphthalene, anthracene, phenanthrene, pyrene and picene. While benzene itself may be used, its boiling point closely approaches that of thionyl chloride and it is difficult to separate the two compounds by distillation. Other hydrocarbons may be used as will appear more fully hereinafter. The process may be performed by adding to the contaminated thionyl chloride an amount of a hydrocarbon which is capable of reacting with sulfuryl chloride to form a chlorinated reaction product in the presence of a Friedel-Crafts catalyst, if necessary, and heating the mixture. Usually this is effected by refluxing the resultant mixture to insure complete reaction, followed by removal of the purified thionyl chloride by distillation, solvent extraction, crystallization or other convenient method.

The nature of the reaction which tends to occur is dependent upon the type of hydrocarbon used and has not been fully determined. Usually the reaction products are halogenated hydrocarbon or sulphochlorinated hydrocarbons. For example, when naphthalene is reacted with sulfuryl chloride 1-chloronaphthalene, which has a boiling point of 263° C. at 760 millimeters of mercury, is produced. Some of the other chloro-substituted naphthalenes which may be produced, such as 2-chloronaphthalene or the poly substituted chloronaphthalenes, have boiling points which are of a similar order of magnitude. Since the boiling point of the thionyl chloride is appreciably lower than 100° C., separation of thionyl chloride from the hydrocarbon chloride by distillation presents no problem. Although most of the hydrocarbons suitable for the purification process are compounds having high boiling points, it does not necessarily follow that the process is restricted to such materials. If the reaction product of sulfuryl chloride and the purifying agent is one from which thionyl chloride may be readily separated, hydrocarbons boiling at relatively low temperatures may be used.

It has further been found that certain olefinic and cyclo-olefinic hydrocarbons and their partially halogenated derivatives are effective when reacted with the contaminated thionyl chloride without resorting to the use of a catalyst. When aromatic hydrocarbons and partially halogenated aromatic hydrocarbons are used as purifying agents they are only slightly effective unless a Friedel-Crafts catalyst is present. Anhydrous aluminum chloride is a Friedel-Crafts type of catalyst which may be used according to this invention, and it has been employed in most of the experimental purification tests which have been performed. However, other Friedel-Crafts type catalysts such as ferric chloride, zinc chloride, and boron fluoride etherate are suitable. When saturated hydrocarbons and partially halogenated saturated hydrocarbons are utilized, a catalyst capable of promoting free radical formation is required. This reaction is activated by actinic light through the use of a mercury arc lamp or by a peroxide catalyst such as benzoyl peroxide.

The invention will be more clearly understood by reference to the following examples which are illustrative of the preferred embodiments of the invention.

Example I

A thionyl chloride-sulfuryl chloride mixture containing 2.07 percent of sulfuryl chloride by weight based upon the weight of the total mixture was prepared. A 75 cubic centimeter portion of this mixture was placed in a round-bottom flask and 5 grams of naphthalene was added. The flask was fitted with a water-cooled reflux condenser and the mixture was heated at reflux temperature for three hours. After refluxing was completed the thionyl chloride was removed by distillation at 72–75° C. The distilled thionyl chloride contained 1.93 percent by weight of sulfuryl chloride.

Example II

To a mixture of 81.3 grams of thionyl chloride containing 2.07 percent by weight of sulfuryl chloride was added 0.1 gram of anhydrous aluminum chloride and 0.8 gram of naphthalene. This quantity of naphthalene was 100 percent in excess of the weight theoretically required to react with sulfuryl chloride to form tetrachloronaphthalene in a reaction which may be represented by the equation:

$$C_{10}H_8 + 4SO_2Cl_2 \rightarrow C_{10}H_4Cl_4 + 4SO_2 + 4HCl$$

This mixture was added to a round bottom flask equipped with a water-cooled reflux condenser and was refluxed at boiling temperature for one hour. At the end of this period, the loss in weight of the mixture was found to be 2.5 grams. After another hour of reflux, the additional weight loss was only 0.4 gram indicating that the reaction had been essentially completed during the first hour. The subsequently distilled thionyl chloride contained 0.06 percent by weight of sulfuryl chloride. 76 grams of thionyl chloride was recovered, indicating a product recovery of 93.6 percent.

Example III

To 50 cc. (81.3 grams) of thionyl chloride solution containing 2.27 percent by weight of sulfuryl chloride was added 2.2 grams of anthracene, $C_{14}H_{10}$. This represents a 100 percent excess over the theoretical amount of anthracene needed to combine with sulfuryl chloride according to the equation:

$$C_{14}H_{10} + 2SO_2Cl_2 \rightarrow C_{14}H_8Cl_2 + 2HCl + 2SO_2$$

An immediate reaction between the hydrocarbon and the stock solution took place with a darkening of the solution. 0.8 gram of anhydrous aluminum chloride was added to the mixture and it was boiled under reflux for two hours. An 86.8 percent recovery of thionyl chloride containing 0.12 percent by weight of sulfuryl chloride was obtained.

This experiment shows that this particular hydrocarbon may be used effectively even in the absence of aluminum chloride, as evidenced by the immediate reaction at room temperature. The lowered thionyl chloride recovery points to a partial reaction between the hydrocarbon and thionyl chloride. Such reaction can be minimized by the use of a smaller amount of anthracene and/or refluxing for a shorter period of time.

Example IV

To 50 cubic centimeters (81.3 grams) of thionyl chloride containing 2.27 percent by weight of sulfuryl chloride was added 1.3 grams of a mixture of ortho, meta, and para xylene. This represents a 100 percent excess over the theoretical amount of the mixed xylene needed to combine with sulfuryl chloride according to the equation:

$$C_6H_4(CH_3)_2 + 2SO_2Cl_2 \rightarrow C_8H_8Cl_2 + 2SO_2 + 2HCl$$

0.8 gram of anhydrous aluminum chloride was added through a reflux condenser. The mixture was heated at reflux temperature for 2 hours and the thionyl chloride was removed by distillation. A recovery of 94.7 percent thionyl chloride containing 0.76 percent by weight of sulfuryl chloride was obtained.

Example V

To determine the effectiveness of a non-aromatic hydrocarbon, 2.0 grams of kerosene comprising aliphatic hydrocarbons and having a boiling range of 160 to 220° C. and 81.4 grams (50 cubic centimeters) of thionyl chloride containing 2.08 percent by weight of sulfuryl chloride were placed in a round bottom flask and boiled at reflux for 2 hours. 79.4 grams of thionyl chloride containing 1.97 percent by weight of sulfuryl chloride was recovered by distillation.

To the same amount of the stock solution was added 2.0 grams of kerosene and 0.8 gram of anhydrous aluminum chloride. When the catalyst was added, the solution developed a slight brown color which deepened as the mixture was boiled at reflux temperature for 2 hours. 93 percent of the thionyl chloride was recovered by distillation. It contained 0.13 percent by weight of sulfuryl chloride as an impurity. A dark solid residue remained in the flask after distillation of the thionyl chloride but this was easily removed.

Example VI 81.4 grams (50 cubic centimeters) of the mixture of thionyl chloride and sulfuryl chloride used in Example V was boiled at reflux temperature with 2.0 grams of kerosene for 6 hours while exposing the flask to the actinic radiation produced by a Uviarc mercury vapor lamp. This lamp emits a light having a wave length of from 2500 to 6000 Angströms. The liquid in the flask developed a progressively intense yellow color as reflux continued. A yield of 76.6 grams (95.8 percent recovery) of thionyl chloride containing 0.40 percent by weight of sulfuryl chloride was obtained. A black liquid residue remaining in the flask was readily removable after the thionyl chloride had been distilled.

*Example VII*

To a mixture of 81.4 grams (50 cubic centimeters) of thionyl chloride containing 2.08 percent by weight of sulfuryl chloride, 1.0 gram of naphthalene was added and the mixture placed in a round bottom flask. A reflux condenser was fitted to the flask and 0.5 gram of anhydrous ferric chloride was added through the condenser the mixture was then boiled at reflux temperature for 2 hours and 73.8 grams (92.5 percent recovery) of thionyl chloride was obtained by distillation. The distilled thionyl chloride contained 0.23 percent by weight of sulfuryl chloride. A solid black residue remained in the flask but this was removed without difficulty.

It should be observed that the residue which remains after distilling the thionyl chloride from the reaction mixtures is readily removed whereas certain other purification processes produce solid masses which appear to present a serious removal problem. This is of prime importance in a commercial purification process. Obviously the use of materials which react with sulfuryl chloride to produce residual deposits that cannot be easily removed would interfere with the economical operation of a purification process to a considerable extent.

While in the examples there was used an amount of hydrocarbon which is 100 percent in excess of that required to combine with all of the sulfuryl chloride in the stock samples, it is not necessary to add such a large amount in order to reduce the sulfuryl chloride content of contaminated thionyl chloride. Generally speaking, the amount of hydrocarbon added should be at least that amount required to react with all of the sulfuryl chloride present in the mixture. Although the preferred hydrocarbons selectively react with sulfuryl chloride, some reaction tends to occur between the hydrocarbon and the thionyl chloride itself. Consequently, while sufficiently large amounts of the purifying agent must be added to insure theoretically complete reaction with all of the sulfuryl chloride present, the amount of hydrocarbon should not be so great as to react with a large amount of thionyl chloride. Accordingly the amount of hydrocarbon should not be more than that theoretically required to react with the sulfuryl chloride and not more than 30 percent of the thionyl chloride. Generally the amount of hydrocarbon used should not exceed 5 moles per mole of sulfuryl chloride in the thionyl chloride.

A wide variety of hydrocarbons and partially halogenated hydrocarbons may be employed in the purification process. As has been previously noted, saturated and unsaturated aliphatic hydrocarbons, aromatic hydrocarbons, arylaliphatic hydrocarbons, cycloaliphatic hydrocarbons and the partially halogenated derivatives of all of these hydrocarbons are effective. As a general rule, it is preferred to use halogenated hydrocarbons having a degree of halogenation which is less than 50 percent of the maximum degree of halogenation theoretically obtainable by reacting any given compound with a halogen or halogen-yielding material under conditions favoring complete halogenation of the halo-hydrocarbon.

Both saturated and unsaturated aliphatic hydrocarbons and their partially halogenated derivatives are suitable. Olefinic compounds having more than one unsaturated group in the chain such as butadiene-1,3 or isoprene are not considered particularly desirable in view of possible polymerization of the compound or compounds obtained when sulfuryl chloride and thionyl chloride react with the olefinic compound. Such a result complicates the ease of removal of the residue after thionyl chloride has been removed, since the residue may be unusually tacky or may even become a solid mass. However, diolefins, alkynes, alkenynes and alkadiynes may be employed wherever the residual mass is not of such a character as to make its removal a serious problem. In this connection, acetylene, ethylacetylene, dimethylacetylene, vinyl acetylene, diacetylene and dipropargyl are satisfactory hydrocarbons.

Gaseous, liquid or solid, aliphatic hydrocarbons and halo-substituted aliphatic hydrocarbons are suitable although it is preferred to use compounds having less than twenty carbon atoms in the open chain. Typical materials of this group are hydrocarbons of the methane series such as ethane, propane, pentane, hexane, decane, cetane, and their incompletely halogenated derivatives such as dichloropropanes, pentachloropropanes, dichloropentanes, etc; olefines of the ethylene series such as ethylene, butylene, amylene, octylene, decylene and partially halogenated derivatives of olefinic hydrocarbons.

Typical of the arylaliphatic hydrocarbons suitable for the purification of thionyl chloride are such compounds as hemimellitene, pseudocumene, p-methylisopropylbenzene, diphenylmethane, diphenylethane, diphenylethylene, durene, isodurene, mellitene, prehnitene, stilbene, triphenylmethane, triphenylethylene, triphenylethane, ethyl benzene, amyl benzene, n-propylbenzene, isopropyl benzene, ethyl benzylbenzene and their partially substituted halogen derivatives. Unsaturated benzene hydrocarbons such as styrene, allylbenzene, and propenylbenzene are also suitable.

In addition to the aromatic hydrocarbons hereinbefore referred to as being adaptable to the practice of the invention, the following aromatic hydrocarbons and their partially halogenated derivatives are effective in the purification of contaminated thionyl chloride: diphenyl, naphthacene, pentacene, hexacene, chrysene, 1,2 benzanthracene, coronene, 3,4-benzpyrene, and aryl substituted polynuclear hydrocarbons such as rubrene. As a general rule, aromatic or arylaliphatic hydrocarbons having not over 8 benzene rings are preferred to those having a more complex structure.

Although benzene itself is not well suited to the purification process because of the fact that its boiling point approximates that of thionyl chloride, numerous monophenyl halides are satisfactory. Chlorobenzene, bromobenzene, iodobenzene, and such aromatic polyhalides as p-dichlorobenzene, o-dichlorobenzene, p-dibromobenzene are readily adaptable to the purification of thionyl chloride. Aryl substituted unsaturated halides having no more than one unsaturated group in the side chain, such as beta or gamma chlorostyrene and beta or gamma bromostyrene are likewise suitable.

The amount of catalyst required does not appear to be a critical factor. As little as 0.1 percent of anhydrous aluminum chloride based on the weight of the contaminated thionyl chloride is sufficient to promote the reaction with a hydrocarbon such as anthracene. Larger amounts ranging to as much as 1% by weight of the contaminated thionyl chloride may be used but excessive quantities are not required. Equivalent amounts of other catalysts may be employed without particular concern as to critical limitations.

Although it is preferred to conduct the purification process under reflux at the boiling point of the hydrocarbon-thionyl chloride-sulfuryl chloride mixture, lower temperatures may be employed in which case the reaction time may have to be extended somewhat. Although it is preferable that the mixture be heated to a temperature greater than room temperature, it is possible that through the use of actinic irradiation or other unusually active catalyst the purification may proceed at room temperature, or even at lower temperature. Two hours of refluxing is usually sufficient to complete the reaction with various effective hydrocarbons, but shorter periods of time may be found satisfactory. Temperatures in excess of those encountered at reflux may be reached if the reaction is conducted in a closed system such as an autoclave. In such instances temperatures of 150° to 200° C. or even higher may be reached. Naturally, the length of heating time will be dependent upon the sulfuryl chloride content of the thionyl chloride, the type of hydrocarbon employed and the ultimate reduction in sulfuryl chloride content desired. Moreover where no catalyst is used, longer periods of reflux will be necessary than where a catalyst is used.

While the preferred purification process is conducted between liquid reactants or between liquid and solid reactants, a vapor phase reaction may be employed. In such a case the thionyl chloride-sulfuryl chloride mixture may be contacted in vapor phase with hydrocarbons which are in either vapor or solid phase.

Although the examples are illustrative of batch operations, the process is obviously adaptable to a continuous purification wherein the chlorinated residue is periodically removed from the reaction vessel when the concentration becomes excessive.

Although the invention has been described with respect to certain specific embodiments, it is not intended that the details thereof shall be regarded as limitations on the scope of the claims except as incorporated in the following claims:

I claim:

1. A method of reducing the sulfuryl chloride content of thionyl chloride contaminated by sulfuryl chloride in amount which is minor with respect to thionyl chloride which comprises heating the contaminated thionyl chloride with a compound selected from the group consisting of hydrocarbons and partially halogenated hydrocarbons, until a substantial portion of sulfuryl chloride has been reacted and separating thionyl chloride from the reaction mixture.

2. The method described in claim 1 where the compound is selected from the group consisting of aromatic hydrocarbons and partially halogenated aromatic hydrocarbons.

3. A method of reducing the sulfuryl chloride content of thionyl chloride contaminated by sulfuryl chloride in amount which is minor with respect to thionyl chloride which comprises heating the contaminated thionyl chloride with naphthalene in the presence of a catalytic amount of anhydrous aluminum chloride until a substantial portion of sulfuryl chloride has been reacted with the naphthalene and separating the thionyl chloride from the reaction mixture.

4. A method of reducing the sulfuryl chloride content of thionyl chloride contaminated by sulfuryl chloride in amount which is minor with respect to thionyl chloride which comprises heating the contaminated thionyl chloride in the presence of a Friedel-Crafts type of catalyst with a compound selected from the group consisting of an aromatic hydrocarbon and a partially halogenated aromatic hydrocarbon, said compound being capable of reacting with sulfuryl chloride, until a substantial portion of sulfuryl chloride has been consumed by the hydrocarbon, and separating thionyl chloride from the reaction mixture.

5. A method of reducing the sulfuryl chloride content of thionyl chloride contaminated therewith in amount which is minor with respect to thionyl chloride which comprises reacting the contaminated thionyl chloride with a compound of the group consisting of hydrocarbons and partially halogenated hydrocarbons until a substantial portion of sulfuryl chloride has been reacted with the hydrocarbon leaving a substantial amount of thionyl chloride unreacted and separating the thionyl chloride from the resulting reaction products.

6. A method of reducing the sulfuryl chloride content of thionyl chloride containing up to 5% of sulfuryl chloride based upon the weight of thionyl chloride which comprises reacting the thionyl chloride with a compound of the group consisting of hydrocarbons and partially halogenated hydrocarbons until a substantial portion of sulfuryl chloride has been consumed by the hydrocarbons, and separating thionyl chloride from the reaction mixture.

7. The process of claim 6 wherein the amount of hydrocarbon which is added to the thionyl chloride is below that which will react with 30% of the thionyl chloride.

8. A method of reducing the sulfuryl chloride content of thionyl chloride containing up to 5% of sulfuryl chloride based upon the weight of thionyl chloride, which comprises adding a quantity of hydrocarbon not in excess of 5 mols of hydrocarbon per mol of sulfuryl chloride to the thionyl chloride, heating the mixture until a substantial portion of the sulfuryl chloride has reacted with the hydrocarbon and separating the thionyl chloride from the reaction mixture.

WILLIAM E. BISSINGER.

REFERENCES CITED

The following references are of record in the file of this patent:

UNITED STATES PATENTS

| Number | Name | Date |
| --- | --- | --- |
| 1,765,601 | McKee | June 24, 1930 |
| 2,302,228 | Kharasch | Nov. 17, 1942 |